United States Patent [19]

Sawyer

[11] 3,720,056

[45] March 13, 1973

[54] DRIVE OR INDICATING SYSTEM EMPLOYING FLUID CONTROLS

[76] Inventor: Bruce A. Sawyer, 20120 Allentown Drive, Woodland Hills, Calif. 91364

[22] Filed: Dec. 28, 1970

[21] Appl. No.: 101,998

[52] U.S. Cl. ..............................60/1, 33/1, 346/29, 248/23

[51] Int. Cl. ..............................F03g 7/00

[58] Field of Search ..................33/1; 346/29; 248/23

[56] References Cited

UNITED STATES PATENTS 3,376,578 4/1968 Sawyer ..................................346/29

*Primary Examiner*—Martin P. Schwadron
*Assistant Examiner*—Allen M. Ostrager
*Attorney*—Smyth, Roston & Pavitt

[57] ABSTRACT

This invention relates to a system in which a head is displaced from, but is in contiguous relationship to, a platen and is driven or is positionable along either a single axis or a pair of coordinate axes relative to the platen. The head and the platen have grooves for receiving a fluid such as pressurized air which causes the head and the platen to interact so that the head is driven on a controlled basis along either the single axis or independently along the pair of coordinate axes relative to the platen. Because of the provision of the grooves in the head and the platen, the position of the head relative to the platen can be indicated at each instant as the head moves along the platen. Means may be provided on the head for preventing the head from rotating as it moves along the platen. Means may also be provided in the head for maintaining the head in displaced relationship to the platen.

41 Claims, 13 Drawing Figures

INVENTOR:
Bruce A. Sawyer
By Smyth, Roston & Pavitt
ATTORNEYS

INVENTOR:
Bruce A. Sawyer

By Smyth, Roston & Pavitt

ATTORNEYS

INVENTOR:
Bruce A. Sawyer
By Smyth, Roston & Pavitt
ATTORNEYS

INVENTOR:
Bruce A. Sawyer
By Smyth, Roston & Pavitt
ATTORNEYS

DRIVE OR INDICATING SYSTEM EMPLOYING FLUID CONTROLS

This invention relates to a system for driving a member relative to a platen along either a single axis or a pair of coordinate axes or for indicating the position of the member relative to the platen along either the single axis or the pair of coordinate axes. The invention further relates to a drive or position-indicating system in which the drive member and/or the indicating member are disposed in displaced but contiguous relationship to the platen.

Systems for positioning a member relative to a surface along x and y axes have been known for a considerable number of years. However, such systems have not provided a direct indication of the position of the member relative to the surface as the member is driven along the surface. Considerable effort has been devoted to perfecting such systems so that the systems will be responsive to the operation of a computer for driving a member such as a stylus relative to a platen or for indicating the position of the stylus relative to the platen. The systems have been operative either along a single axis or along a pair of coordinate axes. Generally the systems have used a first arm supported at opposite ends of the platen for driving the stylus along a first axis. The first arm has in turn supported a second member movable along the second coordinate axis for driving the stylus along the second axis. The stylus has been supported on the second member so as to become positioned in accordance with the resultant movements of the first and second members.

The systems described in the previous paragraph have certain major disadvantages. One disadvantage is that the members movable along each axis are interrelated with and not independent of the movement along the other axis since the arm along the second axis is coupled to the member along the first axis for movement with the arm along the first axis. Another disadvantage has been that the arm has had a large mass and that the arm has been drawn by lead screws or cables. This has caused the arm to respond at a limited speed to any force exerted against the arn so that any movement of the stylus between successive positions has occurred at a low rate. A further disadvantage is that the system does not inherently provide an indication as to the position of the stylus at each instant so that complex arrangements have to be provided to provide such an indication.

The disadvantages described in the previous paragraph are overcome in a system disclosed and claimed in U.S. Pat. No. 3,376,578 issued to me on Apr. 2, 1968, for a "Magnetic Positioning Device." The system disclosed and claimed in U.S. Pat. No. 3,376,578 includes a head which is disposed in displaced but contiguous relationship to the platen so that movement of the head relative to the platen along either a single axis or a pair of coordinate axes occurs without any friction between the head and the platen. Since the head is disposed in displaced but contiguous relationship to the platen, the head can be moved along each axis independently of the movement of the head along the other axis. In U.S. Pat. No. 3,376,578, the displacement of the head along each axis is obtained by energizing magnetic coils which are disposed on the head. When the coils are energized, they produce an interaction between magnetic poles on the head and magnetic poles on the platen to produce a displacement of the head relative to the platen in accordance with the selective energizing of the coils. When the head is displaced along either axis or both coordinate axes, it causes the poles on the heads to become displaced in a corresponding manner relative to the poles on the platen so that the position of the head relative to the platen is constantly indicated by measuring such displacement.

The system disclosed and claimed in U.S. Pat. No. 3,376,578, has other advantages in addition to those described above. For example, the system can be used to indicate on a direct basis the position of the head relative to the platen without any drive of the head relative to the platen, such as occurs by the energizing of the coils. Means are also included in the system to inhibit the rotation of the head about an axis substantially normal to a surface defined by the first and second coordinate axes. Inhibition of such rotation is important to align the axes of the head and platen in order to insure that proper drive of the head relative to the platen occurs only along the two coordinate axes and that the position of the head relative to the platen is accurately indicated at all times.

This invention relates to a system which provides all of the advantages discussed above for the system disclosed and claimed in U.S. Pat. No. 3,376,578. However, the invention operates on the basis of pneumatic or hydraulic principles rather than the magnetic principles which are included in the system disclosed and claimed in U.S. Pat. No. 3,376,578. As in U.S. Pat. No. 3,376,578, the invention includes a head and a platen with the head disposed in displaced but contiguous relationship to the platen. The system is preferably used with linear coordinates such as X and Y coordinates having a perpendicular relationship to each other but other coordinates such as cylindrical, spherical and circular can also be used.

A plurality of grooves are provided on the head and a plurality of grooves are provided on the platen to interact with the grooves on the head. The grooves are disposed on the head along a first axis for a single-axis system and along a pair of coordinate axes for a two-axis system. Similarly, the grooves are disposed on the platen along the first axis for a single axis system and along the pair of coordinate axes for a two axis system.

The grooves on the head cooperate with the grooves on the platen to provide impedances dependent upon the positions of the grooves on the head relative to the grooves on the platen. Particular grooves on the head are selectively energized so that the head becomes displaced to minimize the impedances between the selectively energized grooves on the head and the associated grooves on the platen. The selective energizing of the grooves on the head is obtained by passing a pressurized fluid such as air through the grooves.

By determining the number of grooves, and fractions thereof, displaced in the head relative to the platen along each of the two coordinate axes, the position of the head relative to the platen can be determined and indicated at all times. Furthermore, the passage of fluid such as pressurized air through the grooves operates to insure that the head will be disposed in displaced but contiguous relationship to the platen at all times so that no friction will be produced between the head and the platen as the head moves relative to the platen. Means are also provided on the head for insuring that the head will not be improperly rotated relative to the platen. As previously indicated, such rotation should be inhibited since it adversely affects the indication as to the position of the head relative to the platen.

Figures 2, 3, 7:
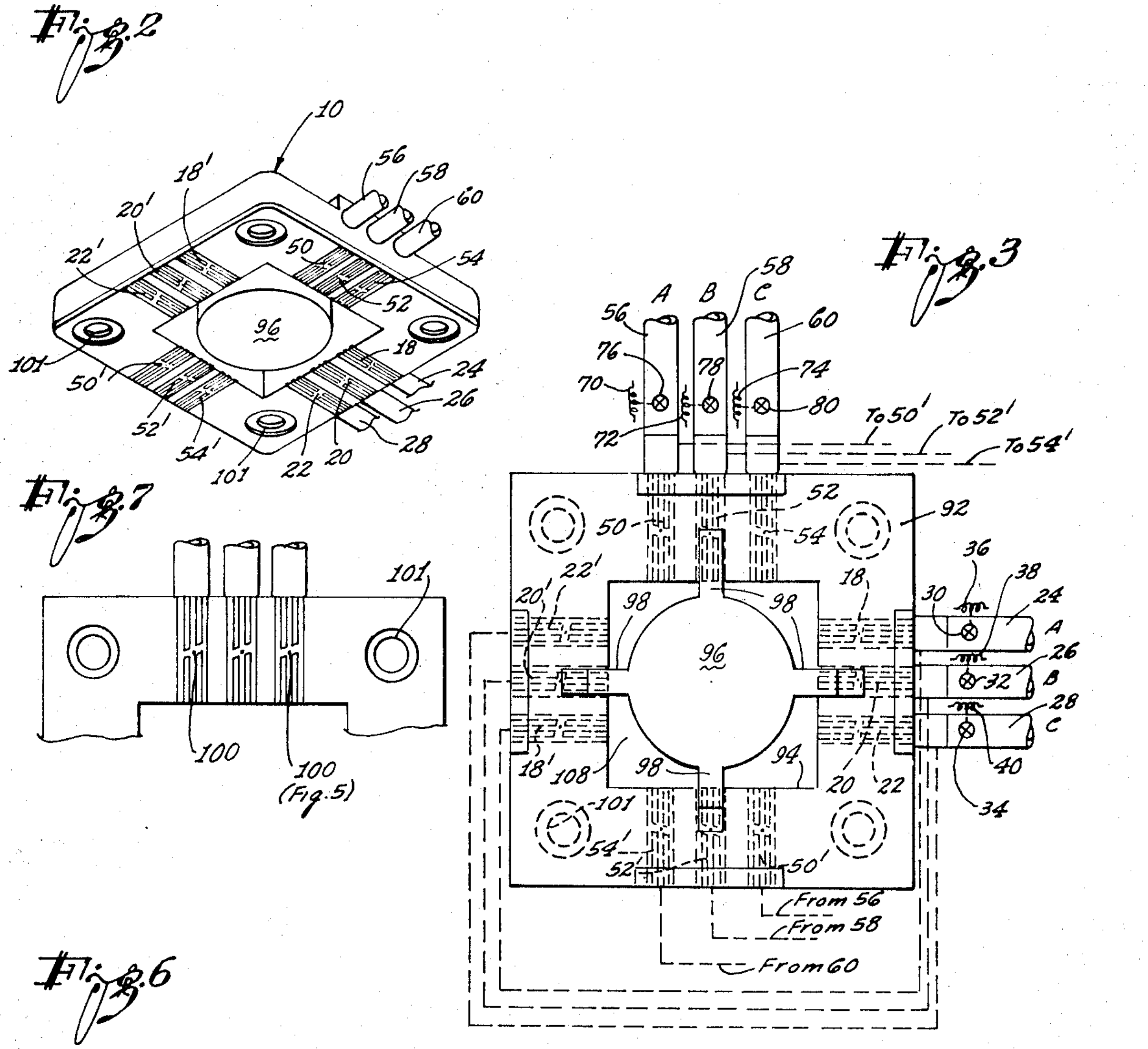
FIG. 2 is an enlarged perspective view of the head shown in FIG. 1 as seen from a position below and to one side of the head.
FIG. 3 is a top plan view of the head shown in FIGS. 1 and 2.
Figure 6:
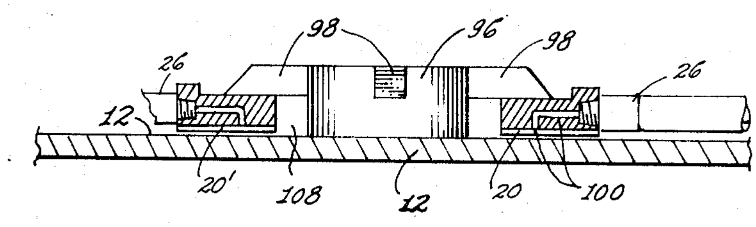
Figure 4:
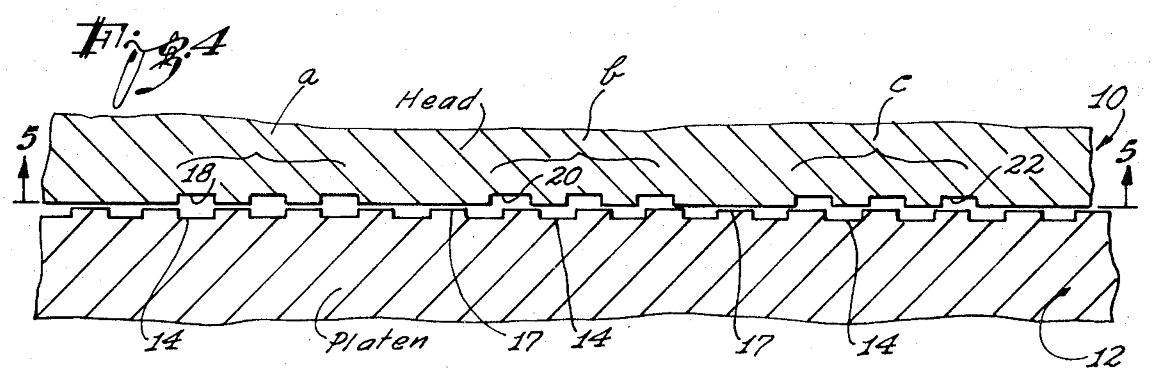
FIG. 4 is an enlarged fragmentary section, in elevation, showing relative dispositions of the head and the platen in one operative relationship along one coordinate axis.
Figure 4A:
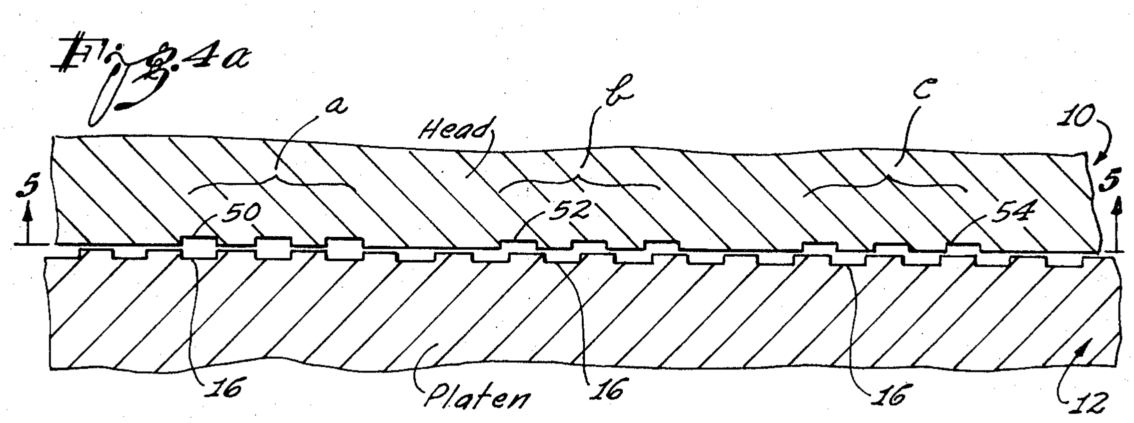
Figure 5:
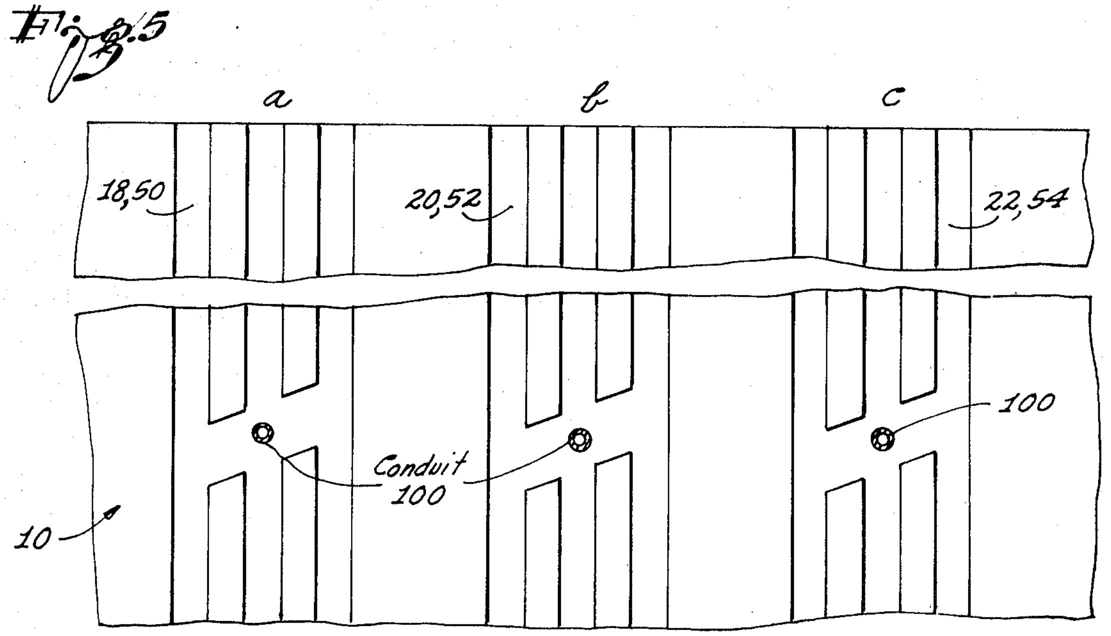
Figures 8, 9:
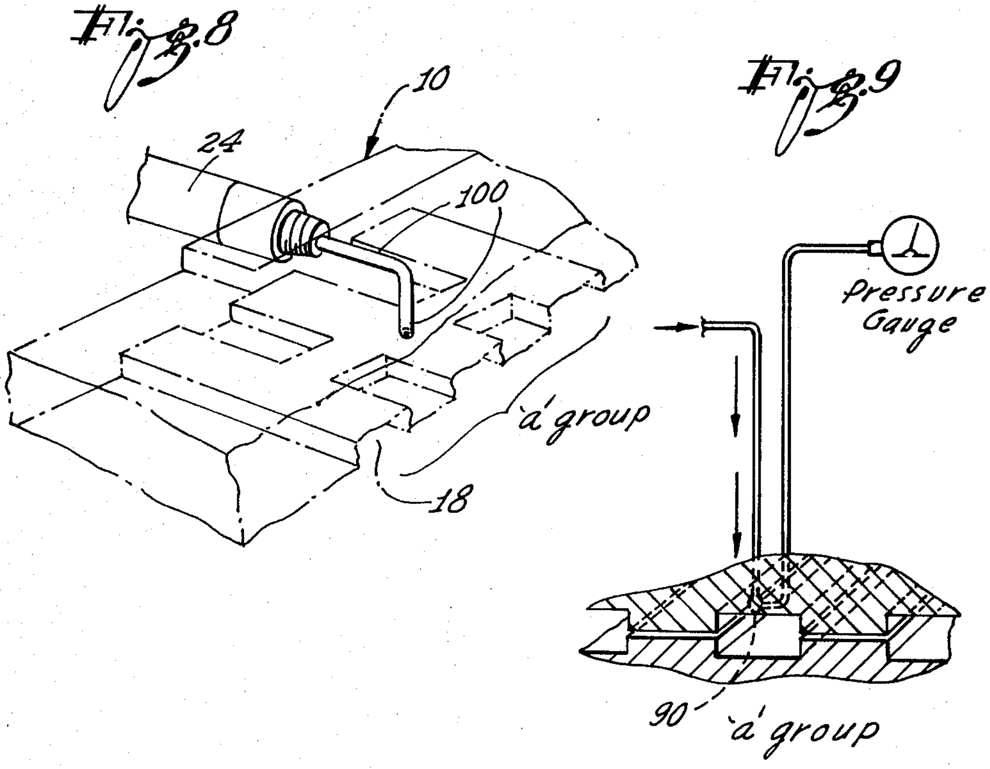
Figure 10:
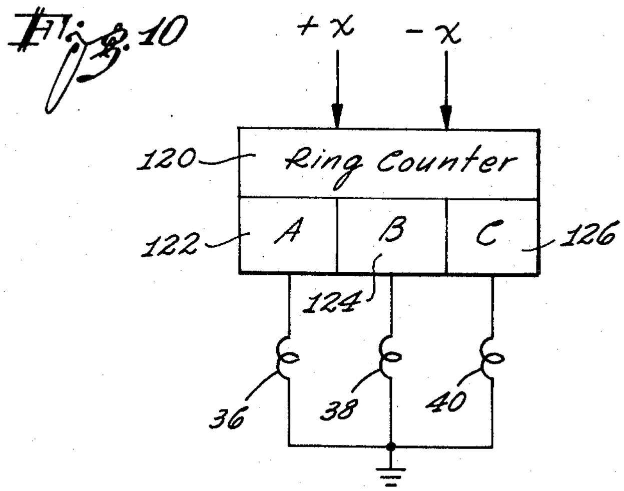
Figure 12:
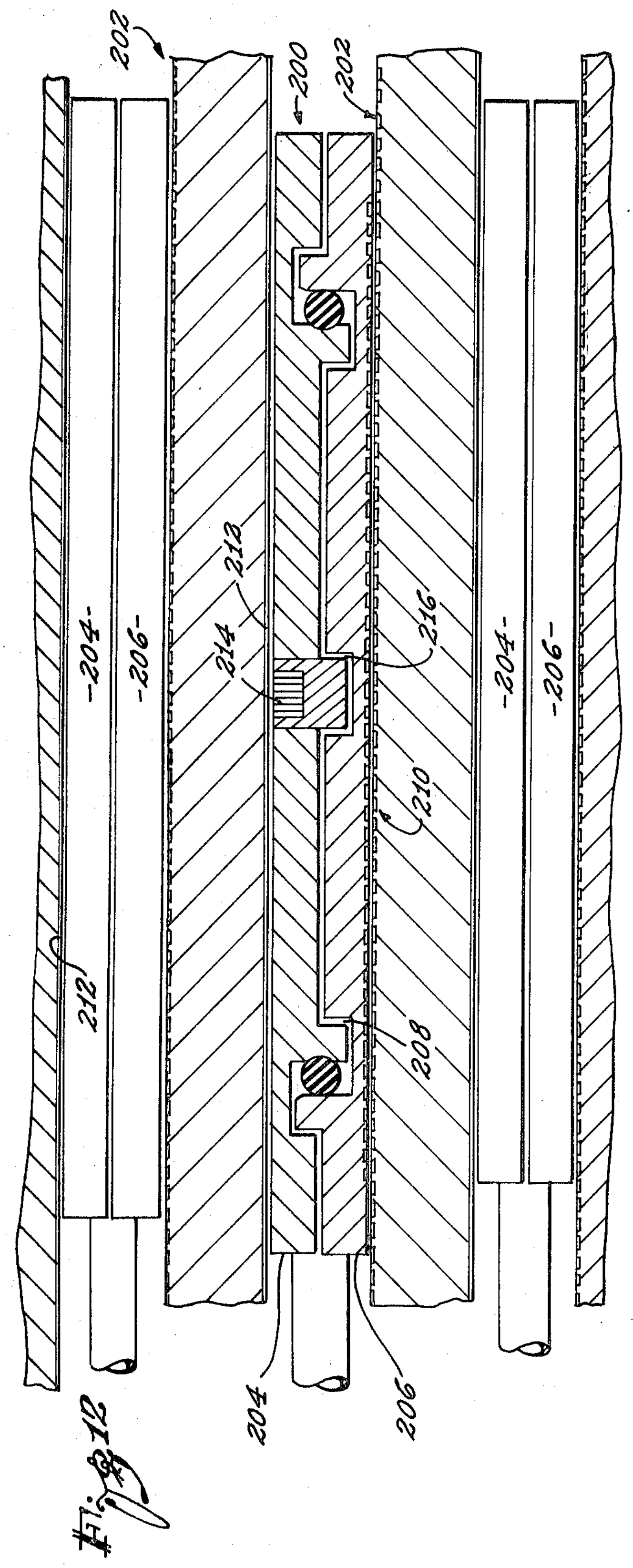
Figure 11:
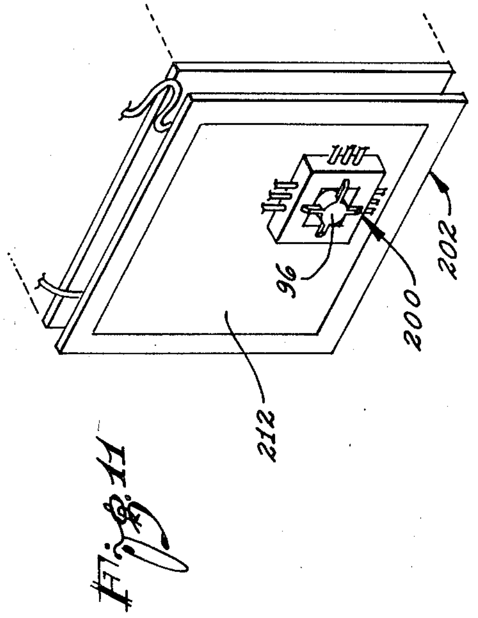

FIG. 4*a* is an enlarged fragmentary section, in elevation, showing relative dispositions of the head and the platen in one operative relationship along a second coordinate axis;

FIG. 5 is an enlarged plan view of the head as seen from a position below the head;

FIG. 6 is an enlarged section, in elevation, of the head and the platen;

FIG. 7 is an enlarged fragmentary plan view of the head;

FIG. 8 is a perspective view showing certain of the fluidic features for introducing fluid such as pressurized air to the head;

FIG. 9 is a perspective view of certain fluidic features for obtaining the operation of the head as a position indicator;

FIG. 10 is a simplified circuit diagram of an electrical circuit for producing a controlled movement of the head relative to the platen;

FIG. 11 is a perspective view of a second embodiment of the invention wherein a plurality of heads and platens are disposed in a multi-layer or laminated arrangement; and FIG. 12 is an enlarged fragmentary section, in elevation, illustrating in further detail the embodiment shown in FIG. 11.

In one embodiment of the invention shown in the drawings, a head generally indicated at 10 and a platen generally indicated at 12 are provided. The head 10 is disposed above the platen and is in displaced but contiguous relationship to the platen. The head is adapted to be moved relative to the platen along a single axis such as an X-axis or along a pair of coordinate axes such as the X-axis and the Y-axis.

In one embodiment, the platen 12 may be provided with pluralities of grooves 14. Each of the grooves 14 has a particular width such as a width of approximately 0.030 inches and is separated by lands 17 from the adjacent grooves. Each of the lands 17 may have a width such as a width of approximately 0.030 inches corresponding to the width of the grooves 14. As will be appreciated, however, the width of the lands 17 does not have to conform to the width of the grooves 14 but the widths of all of the lands 17 should be the same. The grooves 14 preferably have equal depths. The grooves 14 extend along the Y-axis when the displacement of the head along the platen is to occur along the X-axis. If the pitch of the grooves is considered as the distance between the center line of one groove and the center line of the adjacent groove, the pitch would then be approximately 0.060 inches.

When the head is to be moved relative to the platen along two coordinate axes, the platen 12 may be provided with a plurality of grooves 16 (FIG. 4*a*). Each of the grooves 16 has a particular width and a particular depth and a particular spacing between grooves. Usually the pitch of the grooves 16 corresponds to the pitch of the grooves 14. The grooves 16 extend along the X-axis when they are to be used in controlling the movement of the head relative to the platen along the Y-axis.

The head 10 may also be provided with pluralities of grooves 18, 20 and 22 (FIG. 4) when the head is to be moved relative to the platen along a particular axis such as the X-axis. The direction of the grooves 18, 20 and 22 corresponds to the direction of the grooves 14. All of the grooves 18 have the same disposition relative to the grooves 14. Similarly, all of the grooves 20 have the same disposition relative to the grooves 14, as do all of the grooves 22. However, the grooves 18 have a different disposition relative to the grooves 14 than do the grooves 20 and the grooves 22. Similarly, the grooves 20 have a different disposition relative to the grooves 14 than do the grooves 18 and 22. For example, the grooves 18 in the head 10 are shown in FIG. 4 as being in aligned relationship with the grooves 14 in the platen 12. The grooves 20 are shown as being displaced to the left relative to the grooves 14 in comparison to the relative dispositions of the grooves 18 and 14. The displacement of the grooves 20 relative to the grooves 18 may be approximately one third the pitch between the grooves. The grooves 22 are shown as being displaced to the right relative to the grooves 14 in comparison to the relative dispositions of the grooves 18 and 14. The displacement of the grooves 22 relative to the grooves 18 may be one-third of the pitch between the grooves. In effect, the grooves 18, 20 and 22 are displaced by 120° from one another in FIG. 4 such that the grooves 18 may be considered as having an 0° displacement, the grooves 20 as having a +120° displacement and the grooves 22 as having a −120° displacement.

Fluid such as pressurized air may be respectively introduced to the grooves 18, 20 and 22 through lines 24, 26 and 28 (FIG. 3). The lines 24, 26 and 28 respectively have valves 30, 32 and 34 which are opened by coils 26, 38 and 40. The fluid such as the pressurized air passing through the grooves are vented to the atmosphere in a manner which will be described subsequently after the fluid has passed through the grooves. The valves may be located separate from the head or, instead of providing separate lines 24, 26 and 28, a main line may be provided with three sub-lines extending from the main line and with a different valve in each of the sub-lines.

When the head 10 is moved relative to the platen 12 along a pair of coordinate axes such as the X and Y axes, grooves 50, 52 and 54 may be provided in the head 10 in a direction corresponding to the grooves 16 in the platen. The grooves 50, 52 and 54 may have a phase-displaced relationship to one another and to the grooves 16 in a manner corresponding to the relationship between the grooves 18, 20 and 22 and the grooves 14. Lines 56, 58 and 60 may be respectively provided to introduce fluid to the grooves 50, 52 and 54, the fluid then being vented to the atmosphere after passing through the grooves. The passage of fluid through the lines 56, 58 and 60 may be respectively controlled by the energizing of coils 70, 72 and 74 which operate to open valves 76, 78 and 80. Instead of being vented to the atmosphere, the fluid could be collected in the grooves around the head and returned to the pump.

When fluid such as pressurized air flows through a particular plurality of grooves such as the grooves 18, 20 and 22, the impedance presented to the flow of fluid is dependent upon the disposition of the grooves relative to the adjacent grooves 14 in the platen 12. For example, the impedance presented to the flow of fluid through the plurality of grooves is dependent upon the disposition of these grooves relative to the grooves 14 in the platen. This may be seen from the following relationship:

$$P_o \approx P_i - (Q\,l/KA^2)$$

where

- $Q$ = Volume flow of fluid.
- $P_o$ = the pressure of the fluid at the end of a set of such grooves such as the grooves 18;
- $P_i$ = the input pressure of the fluid at the end of the input line such as the line 24 at the orifice adjacent to the grooves such as the grooves 18;
- $l$ = the length of the grooves;
- $A$ = the total effective area defined by the grooves 14 and the grooves such as the grooves 18 for passing liquid; and
- $K$ = a constant. The total effective area A is that area where the grooves such as the grooves 18, 20 and 22 are disposed in alignment with the respective ones of the grooves 14.

Figure 1:
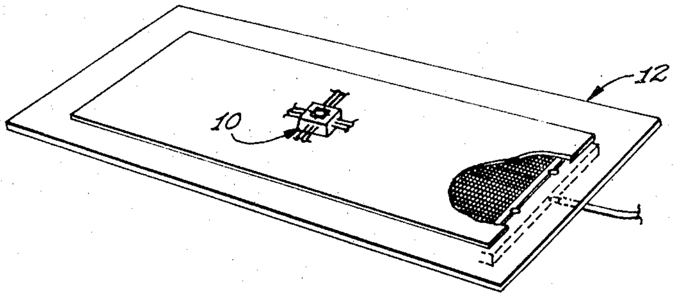
FIG. 1 is a perspective view of a head and platen included in one embodiment of this invention.

In the positioning of the head 10 in FIG. 1, the grooves 18 are disposed in alignment with the adjacent grooves 14 so that the area A is at a maximum. This causes the impedance to the fluid, such as pressurized air, flowing through the grooves 18 and 14 to be at a minimum. Since the impedance provided on the fluid is at a minimum, no force is produced between the head 10 and the platen 12 when the coil 36 is energized to open the valve 30 for the passage of fluid through the pipe 24 and the grooves 18.

When the coil 38 is energized, the valve 32 is opened to provide for the passage of fluid such as pressurized fluid through the pipe 26 and the grooves 20. Since the grooves 20 are not aligned with the grooves 14, an impedance greater than the minimum value is provided in the grooves 20 and 14. In order to minimize the impedance provided to the fluid, the head 10 is moved to the left in FIG. 4 to a position where the grooves 20 become aligned with the grooves 14.

Similarly, fluid is introduced into the grooves 22 and the adjacent grooves 14 when the coil 40 is energized to close the valve 34. Since the grooves 22 in FIG. 1 are displaced from the grooves 14, the impedance provided to the fluid in the grooves 14 and 22 is relatively high. The head 10 is accordingly moved in a direction to align the grooves 22 and 14 so that the impedance presented to the fluid is minimized. As will be seen, this movement occurs in a direction toward the right in FIG. 4.

It will be seen from the above discussion that the movement of the head 10 relative to the platen 12 can be controlled by selectively energizing the coils 36, 38 and 40. For example, when the coils are selectively energized in the order 36, 38 and 40, the head 10 is progressively moved to the left relative to the platen in FIG. 4. However, when the coils are selectively energized in the order 40, 38 and 36, the head 10 is progressively moved to the right relative to the platen in FIG. 4. Similarly, controlled displacements of the head 10 relative to the platen 12 along the Y-axis may be obtained by the order in which the coils 70, 72 and 74 are selectively energized.

It will be appreciated that the movement of the head 10 relative to the platen 12 is controlled by the interaction of the selectively activated grooves on the head relative to the grooves on the platen. As previously described, this interaction is of a nature to produce force on the head relative to the platen in a direction to tend to minimize the impedance to the flow of the fluid in the selectively activated grooves in the head and the adjacent grooves in the platen.

Since the selective energizing of each plurality of grooves such as the grooves 18 causes the head to be displaced relative to the platen by a particular distance related to the width of the grooves, the positioning of the head relative to the platen can be accurately determined and indicated. For example, progressive displacements of the head 10 relative to the platen 12 along the X-axis are represented by selective energizings of the coils 36, 38 and 40. In this way, the selective energizings of the coils 36, 38 and 40 produces a drive of the head 10 relative to the platen 12 along the X-axis and at the same time provides an indication of the displacement of the head relative to the platen along this axis. Similarly, the selective energizing of the coils 70, 72 and 74 produces a drive of the head 10 relative to the platen 12 along the Y-axis and at the time provides an indication of the displacement of the head relative to the platen along this axis.

It should be noted that the spacing between the grooves is not limited to that illustrated. Actually, the system will operate with any spacing that satisfies the expression:

$$s = p(n \pm 1/\phi)$$

where

- $s$ = the distance between the center lines of adjacent sets of grooves which are energized in sequence in the operation of displacing the head 10 relative to the platen;
- $p$ = the width or pitch of the grooves;
- $n$ = an integer 1, 2, 3 . . . ; and
- $\phi$ = the number of phases of the system and is greater than two.

In the example described above, $\phi = 3$. However, in U.S. Pat. No. 3,457,482 issued to me on July 22, 1969, a system is disclosed and claimed where $\phi = 4$. Actually, systems with increased values of $\phi$ may be considered as desirable in certain respects since the progressive displacement of the head 10 relative to the platen 12 occurs in increments of decreased value as the number of phases increases.

It will be appreciated that the head 10 may be used solely as apparatus for indicating positions rather than as drive apparatus as described above. When the head 10 is used to indicate position, the movement of the head 10 relative to the platen will cause progressive changes in the fluidic impedances in successive pluralities of grooves such as the grooves 18, 20 and 22. These progressive changes in the fluid impedances may be measured to indicate the direction and magnitudes of the progressive displacements of the head 10 along the particular axis such as the X-axis. For example, probes 90 (FIG. 9) may be disposed in the grooves such as the grooves 18 to measure the impedance of the fluid in such grooves. As will be appreciated, the pressure of the fluid in the grooves will vary in an undulating pattern as the head 10 is displaced relative to the platen, the variation in pressure providing an indication of the impedance, and hence the position of the grooves 18 relative to the grooves 14.

In one embodiment of the invention, the head 10 may be constructed as shown in FIG. 3. The head is in the form of a picture frame having portions 92 along the four sides for receiving the grooves such as the grooves 18, 20 and 22 and having an opening 94 in the center of the platen. The peripheral portions 92 and the central opening 94 may be considered as defining a configuration of a "picture frame." As will be appreciated, when pressurized air is used as the driving fluid, the air is selectively introduced through the lines 24, 26 and 28 to the grooves 18, 20 and 22 and is vented or exhausted to the atmosphere through the opening 94 and around the outside periphery of the peripheral portions 92.

As the fluid such as the pressurized air flows selectively through the grooves 18, 20 and 22 in the head 10 and the grooves 14 in the platen 12, it tends to provide an air bearing between the head 10 and the platen 12. This air bearing is instrumental in maintaining the head in displaced but contiguous relationship to the platen 12 so that no friction is produced between the head and the platen as the head is moved along the platen.

Means may be provided for insuring that the head will be disposed in contiguous relationship to the platen. Such means may be a weight preferably disposed at the center of the head when the head is seen on a plan view. Preferably such means for disposing the head in contiguous relationship to the platen is magnetic. For example, a permanent magnet 96 may be provided at the center of the opening 98 in the head and may be connected by legs 98 to the peripheral portions 92 of the head. The permanent magnet 96 interacts with the platen 12, which may be made from a magnetic material, so that the head is attracted to the platen. Even with this attraction, the head is displaced from the platen because of the air bearing provided by the flow of the fluid such as pressurized air through the grooves such as the grooves 14 and selective ones of the grooves 18, 20 and 22.

The displacement of the head from the platen, but in contiguous relationship to the platen, may be further facilitated by the provision of recesses 101 in the corners of the head (FIG. 7). The head 102 may be set in shallow sockets 103. Air under pressure may be passed through the recesses 101, the air escaping through the shallow sockets 103. Such an arrangement may be provided to facilitate the production of an air bearing between the head 10 and the platen 12.

The selective introduction of fluid such as pressurized air to the grooves in the head may be provided in a number of different ways. One way of providing such introduction of fluid is illustrated in FIGS. 6 and 8. As will be seen, the fluid such as the pressurized air passes through the inlet lines such as the line 24 to conduits such as the conduit 100.

Skewed slots 106 (FIGS. 5 and 7) are provided in the upper walls of the grooves such as the grooves 18, 20 and 22 to direct the fluid such as the pressurized air in the direction of such slots. The fluid then passes from the slots through the associated grooves such as the grooves 18. The slots are preferably skewed so that the fluid such as the pressurized air will be directed properly into the grooves such as the grooves 18 controlling the displacement of the head 10 relative to the platen 12 along the X-axis. Preferably the slots 104 are skewed at a particular angle such as an angle of 45° to the associated grooves such as the grooves 18, 20 and 22 such that the slot providing for the introduction of fluid into the grooves in one direction will not interact with the grooves in the other direction in the platen to produce spurious forces.

It may be desired to inhibit rotation of the head relative to the platen about an axis substantially normal to a surface defined by the X-axis and the Y-axis. This may be accomplished by providing grooves 18, 20 and 22 (FIGS. 2 and 3) in the platen 10 in diametrically opposed relationship to the grooves 18, 20 and 22. The grooves 18', 20' and 22' preferably have a configuration, disposition and dimensions respectively corresponding to the grooves 18, 20 and 22. Lines such as lines 108 (FIG. 3) are provided for introducing the fluid such as the pressurized air from the lines 24, 26 and 28 to the grooves 18', 20' and 22'. By providing the grooves 18', 20' and 22' in diagonally opposed relationship to the grooves 18, 20 and 22, any tendency for the fluid flowing through the grooves 18, 20 and 22 to rotate the head in one direction is opposed by the tendency of the fluid flowing through the grooves 18', 20' and 22' to rotate the head in the opposite direction. If desired, grooves 50', 52' and 54' may also be provided in the head 10 in diagonally opposed relationship to the grooves 50, 52 and 54 and may be provided with a configuration, disposition and dimensions respectively corresponding to the grooves 50, 52 and 54. By providing the grooves 18', 20' and 22' and possibly the grooves 50', 52' and 54, the rotation of the head 10 relative to the platen 12 is inhibited on any axis substantially normal to the surface of the platen.

FIG. 10 illustrates one embodiment of an electrical system for controlling along one axis, such as the X-axis, the operation of the system shown in FIGS. 1 to 9, inclusive, and described above. The system shown in FIG. 10 includes a ring counter 120 which may have a conventional construction and which operates to provide a count or indication such as "1," "2," or "3" respectively providing a selection of the valve coils 36, 38 and 40. Amplifiers such as amplifiers 122, 124 and 126 may respectively receive signals from the ring counter 120 and may respectively amplify these signals before respectively introducing the signals to the coils 36, 38 and 40 (also shown in FIG. 3). As will be appreciated, a system similar to that shown in FIG. 10 may be provided for controlling the operation of the system shown in FIGS. 1 to 9, inclusive, along the second coordinate axis such as the Y-axis.

A multi-layer or laminated embodiment of the invention is shown in FIGS. 11 and 12. The embodiment includes a plurality of heads generally indicated at 200 and a plurality of platens generally indicated at 202. The heads 200 and the platens 202 are disposed in stacked relationship with the heads alternately disposed relative to the platens. Each head 200 is formed from a pair of interrelated members 204 and 206 which are separated from each other by a fluid spacing 208. Fluid such as the pressurized air is introduced to each spacing 208 to press the adjacent member 204 on a controlled basis against the undersurface of the platen 202 above that member and to press the adjacent member 206 on a controlled basis against the top surface of the platen 202 below that member. In this way, the members 204 and 206 have a floating relationship to each other on an air bearing produced on the adjacent faces of the members.

The bottom surface of each member 206 and the top surface of the platen 202 are provided with grooves, generally indicated at 210, in a manner similar to that described above to obtain a controlled movement between the head and the associated platen along the X-axis and the Y-axis. As will be appreciated, each head in the multi-layer or laminated arrangement can be displaced independently of every other head in the arrangement without any effect on any of the other heads or platens in the arrangement.

The undersurface of each platen 202 may be coated with a thin layer of magnetizable material 212 having properties of recording information on the magnetizable material of reproducing such information from the magnetizable material after recording. The recording of such information on the magnetizable material and the reproduction of such information from the magnetizable layer may be provided by a magnetic head 214 supported on an associated one of the members 204 and extending into a socket 216 in the associated member 206. A pattern of information can be recorded by the magnetic head 214 on the adjacent magnetizable material 212 or read by the magnetic head from the adjacent magnetizable material 212. As will be appreciated, the pattern of information is recorded on, or reproduced from, the magnetizable material 212 at a position dependent upon the positioning of the head 200 relative to the platen 202. In this way, a random access magnetic memory may conveniently be formed.

As will be appreciated, other media than magnetic may be provided for the platens and the heads in the embodiment shown in FIGS. 11 and 12. For example, fiber optics may be substituted for the magnetic heads 214 to provide a semi-permanent optical memory or to provide an optical plotter.

The term "independent displacement" or "independent movement" is used in the claims. As used in the claims, the term is intended to mean that the head can be displaced relative to the platen simultaneously in two directions so that the displacement of the head along one coordinate may be any fraction of the displacement of the head along the second coordinate. The term is also intended to cover any simultaneous displacement of the head along the two coordinates (such as the $x$ and $y$ coordinates) where the displacement is controlled by $y = f(x)$, signifying that $y$ is a function of $x$.

It should be appreciated that the pitch between the grooves in the head may be different than the pitch between the grooves in the platen. It should also be appreciated that the number of phases of the grooves in the platen may be $n$, where $n = 3$ as in the embodiments described above or any numbers greater than 3. When more than three phases are used, two or more phases may be simultaneously excited. For example, when five phases are used for the grooves in the head three phases may be energized at one time and two phases at other times, as disclosed in U.S. Pat. No. 3,376,578.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In a system for providing a controlled relative movement between two members along first and second coordinate axes, the combination of:
a first member,
first and second fluid means on the first member,
a second member disposed relative to the first member for independent displacement between the first and second members along each of the first and second coordinate axes,
third fluid means operatively coupled to the second member and cooperative with the first fluid means for producing a fluid interaction between the first and third fluid means to provide an independent and arbitrary displacement between the first and second members along the first coordinate axis, and
fourth fluid means operatively coupled to the second member and cooperative with the second fluid means for producing a fluid interaction between the second and fourth fluid means to provide an independent and arbitrary displacement between the first and second members along the second coordinate axis.

2. In the system set forth in claim 1:
the first and second fluid means on the first member and the third and fourth fluid means on the second member having properties for providing for a flow of fluid and the first fluid means being disposed on the first members and the third fluid means being disposed on the second member in a direction transverse to the first coordinate axis and second fluid means being disposed on the first member and the fourth fluid means being disposed on the second member in a direction transverse to the second coordinate axis.

3. In the system set forth in claim 2:
the third fluid means having properties of becoming selectively energized and of producing a fluid force, when energized, for cooperating with the first fluid means to produce a displacement between the first and second members along the first coordinate axis and the fourth fluid means having properties of becoming selectively energized and of producing a fluid force, when energized, for cooperating with the second fluid means to produce a displacement between the first and second members along the second coordinate axis.

4. In the system set forth in claim 1:

the first and second members being planar and being disposed in contiguous relationship to each other.

5. In a system for providing a controlled relative movement between two members along first and second coordinate axes, the combination of:

a first member, a second member disposed in contiguous relationship to the first member for independent displacement between the first and second members along each of the first and second coordinate axes, a plurality of first and second fluid means respectively provided in the first member at spaced positions along the first and second coordinate axes to define fluid grooves, third fluid means provided in the second member at spaced positions along the first coordinate axis, said second means being selectively energized and being disposed at particular positions relative to contiguous ones of the first fluid means along a particular one of the first and second coordinate axes and cooperative with the first fluid means, when selectively energized, for interacting with the first fluid means to produce arbitrary displacements between the first member and the second member along the second coordinate axis, and fourth fluid means provided in the second member at spaced positions along the second coordinate axis, said fourth fluid means being selectively energized and being disposed at particular positions relative to contiguous ones of the second fluid means along the other one of the first and second coordinate axes and cooperative with the second fluid means, when selectively energized, for interacting with the second fluid means to produce arbitrary displacements between the first member and the second member along the first coordinate axis.

6. In the system set forth in claim 5:

the first fluid means in the first member defining a first fluid groove structure and each of the third fluid means respectively defining a fluid groove structure for interacting with the first fluid groove structure of the first member to provide a displacement of the first member relative to the second member along the second axis, the third fluid means being displaced relative to each other and to the first fluid groove structure of the first member to provide for the displacement of the second member relative to the first member along the second coordinate axis, each of the fourth fluid means respectively defining a fluid groove structure for interacting with the second fluid groove structure of the first member to provide a displacement of the first member relative to the second member along the first coordinate axis, the fourth fluid means being displaced relative to each other and to the second fluid groove structure of the first member to provide for the displacement of the second member relative to the first member along the first coordinate axis.

7. In the system set forth in claim 6:

the first and second members being planar and being disposed in contiguous relationship to each other.

8. In the system set forth in claim 6:

the first fluid means including first grooves extending in a first direction substantially perpendicular to the second coordinate axis and the second fluid means including second grooves extending in a second direction substantially perpendicular to the first coordinate axis and the third fluid means including grooves disposed in cooperating relationship with the first grooves in the first fluid means and extending in the first direction and the fourth fluid means including grooves disposed in cooperating relationship with the second grooves in the first fluid means and extending in the second direction.

9. In a system for providing a controlled relative movement between two members along first and second coordinate axes, the combination of:

a first member, first and second fluid means on the first member, a second member disposed in contiguous relationship to the first member and movable relative to the first member along first and second coordinate axes and including third fluid means disposed in cooperative relationship with the first fluid means for interacting with the first fluid means to drive the second member relative to the first member only along the first axis and including fourth fluid means disposed in cooperative relationship with the second fluid means for interacting with the second fluid means to drive the second member, independently of the operation of the third fluid means, relative to the first member only along the second axis and inhibiting rotation of the second member relative to the first member about an axis substantially normal to a surface defined by the first and second axes, third means for providing for a selective energizing of the third fluid means to obtain a selective driving of the second member relative to the first member along the first axis, and fourth means for providing for a selective energizing of the fourth fluid means to obtain a selective driving of the second member relative to the first member along the second axis.

10. In the system set forth in claim 9:

the first and second fluid means in the first member being in the form of fluid grooves and the third and fourth fluid means in the second member being constructed in the form of fluid grooves to cooperate with the fluid grooves in the first member in defining fluid passageways for providing independent movements of the first member relative to the second member along the first and second coordinate axes.

11. In the system set forth in claim 9:

the first and second members being planar and being disposed in contiguous relationship to each other.

12. In the system set forth in claim 9:

the third fluid means in the second member being interactive with the first fluid means in the first member for determining the position of the second member relative to the first member along the first axis while cooperating with the first fluid means in the first member to drive the first member relative to the second member along the first axis and the fourth fluid means in the second member being interactive with the second fluid means in the first member for determining the position of the second member relative to the first member along the second axis while cooperating with the second fluid means in the first member to drive the first member relative to the second member along the second axis.

13. In the system set forth in claim 9:

the first and second fluid means in the first member being in the form of fluid grooves and the third and fourth fluid means in the second member being constructed in the form of fluid grooves for cooperation with the fluid grooves in the first member to provide displacements along the first and second coordinate axes and the groove structure constituting the third fluid means being disposed in a direction substantially perpendicular to the first axis and the groove structure constituting the fourth fluid means being disposed in a direction substantially perpendicular to the second axis.

14. In the system set forth in claim 9:

the third fluid means on the second member being selectively energized in accordance with the fluid impedance between the first and third fluid means to provide a displacement of the second member relative to the first member along the first axis in accordance with such selective energizing and the fourth fluid means on the second member being selectively energized in accordance with the fluid impedance between the second and fourth fluid means to provide a displacement of the second member relative to the first member along the second axis in accordance with such selective energizing.

15. In a system for providing a controlled relative movement between two members along first and second coordinate axes, the combination of:

a first member, first and second fluid means disposed in the first member, a second member spaced from the first member and movable relative to the first member along the first and second coordinate axes and including third fluid means interactive with the first fluid means and selectively energizable to drive the second member relative to the first member along the first axis and to simultaneously obtain a determination of the position of the second member relative to the first member along the first axis and further including fourth fluid means interactive with the second fluid means and selectively energizable to drive the second member relative to the first member along the second axis and to simultaneously obtain a determination of the position of the second member relative to the first member along the second axis, third means for providing for a selective energizing of the third fluid means to obtain a selective driving of the second member relative to the first member along the first axis, and fourth means for providing for a selective energizing of the fourth fluid means to obtain a selective driving of the second member relative to the first member along the second axis.

16. In the system set forth in claim 15:

the first and second members being constructed to provide independent movements of the first member relative to the second member along the first and second coordinate axes.

17. In the system set forth in claim 15:

the first and second fluid means being in the form of grooves and the third and fourth fluid means respectively providing with the first and second fluid means impedances dependent upon the respective positioning of the third and fourth fluid means relative to the first and second fluid means and being disposed for cooperation with the first and second fluid means to provide arbitrary movements along the first and second axes in accordance with such impedance values.

18. In the system set forth in claim 15:

the first and second members being planar and being disposed in contiguous relationship to each other.

19. In a system for providing a controlled relative movement between two members along first and second coordinate areas, the combination of:

a first member, first and second fluid means disposed in the first member to provide channels for the flow of fluid, a second member disposed relative to the first member for independent movement relative to the first member along the first and second coordinate axes, third fluid means disposed on the second member and selectively energizable and defining channels with the first fluid means for producing a force between the first and second members to provide an independent movement of the second member relative to the first member along the first axis, fourth fluid means disposed on the second member and selectively energizable and defining channels with the second fluid means for producing a force between the first and second members to provide an independent movement of the second member relative to the first member along the second axis, the third and fourth fluid means being respectively cooperative with the first and second fluid means to provide an indication of the position of the first and second members relative to each other in the first and second coordinate axes in accordance with the movements of the first member relative to the second member along the first and second coordinate axes, third means for selectively energizing the third fluid means, and fourth means for selectively energizing the fourth fluid means.

20. In the system set forth in claim 19:

the first and second members being constructed relative to each other to provide discrete movements of the first member relative to the second member along the first and second axes.

21. In the system set forth in claim 19:

the first and second fluid means on the first member and the third and fourth fluid means on the second member providing channels for the flow of fluid and the first and third fluid means cooperating with one another to produce variable impedances dependent upon their relative positioning and the third fluid means being selectively energized in accordance with the relative impedances provided by the first and third fluid means to produce a force between the first and third fluid means for providing a movement of the second member relative to the first member along the first axis and the second and fourth fluid means cooperating with one another to produce variable impedances dependent upon their relative positioning and the fourth fluid means being selectively energized in accordance with the relative impedances provided by the second and fourth fluid means for providing a movement of the second member relative to the first member along the second axis.

22. In the system set forth in claim 19:

the second means being constructed to inhibit rotation of the second member relative to the first member.

23. In the system set forth in claim 19:

the first and second members being planar and being disposed in contiguous relationship to each other.

24. In a system for providing a controlled relative movement between two members along first and second coordinate axes, the combination of:

a first member, first and second fluid means defined by channels in the first member, a second member disposed in contiguous relationship to the first member for movement relative to the first member independently along the first and second coordinate axes, third fluid means defined by channels on the second member for interacting with the first fluid means on the first member to produce an independent movement of the second member relative to the first member along the first axis, and fourth fluid means defined by channels on the second member for interacting with the second fluid means on the first member to produce an independent movement of the second member relative to the first member along the second axis, the third and fourth fluid means on the second member being respectively cooperative with the first and second fluid means on the first member for maintaining the second member in displaced but contiguous relationship to the first member.

25. In the system set forth in claim 24:

the channels defining the first fluid means in the first member being disposed in a direction substantially perpendicular to the first coordinate axis and being coöperative with the channels defining the third fluid means to obtain a controlled movement of the second member relative to the first member along the first coordinate axis and the channels defining the second fluid means in the first member being disposed in a direction substantially perpendicular to the second coordinate axis and being cooperative with the channels defining the fourth fluid means to obtain a controlled movement of the second member relative to the first member along the second coordinate axis.

26. In the system set forth in claim 24:

further means being included in the first member and extending through the first member to receive fluid under pressure for maintaining the first member in displaced but contiguous relationship to the first member.

27. In the system set forth in claim 26:

the first and second members being planar.

28. In the system set forth in claim 21:

the first fluid means being constructed to prevent rotation of the second member relative to the first member about an axis substantially normal to a surface defined by the first and second axes.

29. In a system for providing a controlled relative movement between two members along a particular axis, the combination of:

a first member, first fluid means defining channels in the first member, a second member spaced from the first member and movable relative to the first member along the particular axis and including second fluid means defined by channels in the second member for interacting with the first fluid means in the first member to drive the second member relative to the first member along the particular axis, the channels defining the second means cooperating with the channels defining the first fluid means to provide a variable impedance dependent upon the positioning of the second fluid means relative to the first fluid means, the second fluid means being selectively energizable in accordance with the variable impedances between the channels inn the first and second fluid means, and means for providing for a selective energizing of the second fluid means to obtain a driving of the second member relative to the first member along the particular axis.

30. In the system set forth in claim 29:

the first and second members being planar and being disposed in contiguous relationship to each other and the particular axis being linear.

31. In the system set forth in claim 29:

the second fluid means being cooperative with the first member for determining the position of the second member relative to the first member along the particular axis while driving the first member relative to the second member along the particular axis.

32. In the system set forth in claim 29:

the first member having a surface adjacent the second member and the second fluid means being constructed to inhibit rotation of the second member relative to the first member on any axis substantially normal to the surface of the first member.

33. In a system for providing a controlled relative movement between two members along a particular axis, the combination of:

a first member, first fluid means defined by channels in the first fluid member, a second member spaced from the first member and movable relative to the first member along the particular axis and including second fluid means defined by channels in the second fluid member, the second fluid means being constructed to interact with the first fluid means on the first member to drive the second member relative to the first member along the particular axis and to simultaneously obtain a determination of the position of the second member relative to the first member along the particular axis, and second means for providing for a selective energizing of the first means to obtain a driving of the second member relative to the first member along the particular axis.

34. In the system set forth in claim 33:

the first and second fluid means being cooperative to maintain the second member in displaced but contiguous relationship to the first member.

35. In the system set forth in claim 33:

the first member having a surface adjacent the second member and the second fluid means being constructed to inhibit any rotation of the second member relative to the first member on any axis.

36. In a system for providing a controlled relative indication of displacements between two members along first and second coordinate axes, the combination of:

a first member, a second member disposed relative to the first member for independent displacement between the first and second members along each of the first and second coordinate axes, first and second fluid means on a particular one of the first and second members, third fluid means disposed on the other one of the first and second members and operatively coupled to the first fluid means and cooperative with the other one of the first and second members for producing an interaction between the first and third fluid means to provide an independent indication of displacement between the first and second members along the first coordinate axis, and fourth fluid means disposed on the other one of the first and second members and operatively coupled to the second fluid means and cooperative with the second fluid means for producing an interaction between the second and fourth fluid means to provide an independent indication of a displacement between the first and second members along the second coordinate axis.

37. In the system set forth in claim 36:

the first and second fluid means including grooves in the particular one of the first and second members and the third and fourth fluid means including grooves in the other one of the first and second members.

38. In a system for providing a controlled relative indication of displacement between two members along first and second coordinate axes, the combination of:

a first member, a second member disposed in contiguous relationship to the first member for independent displacement between the first and second members along each of the first and second coordinate axes, a plurality of first fluid means provided in the first member at spaced positions along the first coordinate axis to define grooves, a plurality of second fluid means provided in the second member at spaced positions along the second coordinate axis to define grooves, third fluid means provided in the second member at spaced positions along the first coordinate axis, said third fluid means being disposed at particular positions relative to contiguous ones of the first fluid means and cooperative with the first fluid means, for interacting with the first fluid means to produce indications of displacements between the first member and the second member along the first coordinate axis, and fourth fluid means provided in the second member at spaced positions along the second coordinate axis, said third fluid means being disposed at particular positions relative to contiguous ones of the second fluid means and cooperative with the second fluid means for interacting with the second fluid means to produce indications of displacements between the first member and the second member along the second coordinate axis.

39. In the system set forth in claim 38:

the first and second fluid means including grooves and each of the third fluid means respectively including grooves for interacting with the grooves of the first fluid means to provide an indication of displacement of the first member relative to the second member along the first axis, the grooves in the third fluid means being displaced relative to each other and to the grooves of the first fluid means to provide for the indication of displacement of the second member relative to the first member along the first axis, each of the fourth fluid means respectively including grooves for interacting with the grooves of the second fluid means to provide an indication of displacement of the first member relative to the second member along the second axis, the grooves in the fourth fluid means being displaced relative to each other and to the grooves of the second fluid means to provide for the indication of displacement of the second member relative to the first member along the second axis.

40. In the system set forth in claim 38:

means for producing controlled forces between the first and second members in a direction for maintaining the first and second members in closely spaced relationship.

41. In the system set forth in claim 1:

means for producing controlled forces between the first and second members in a direction for maintaining the first and second members in closely spaced relationship.

* * * * *